United States Patent
Wooldridge et al.

(10) Patent No.: US 6,648,089 B1
(45) Date of Patent: Nov. 18, 2003

(54) COOLING MODULE MOUNTING SYSTEM AND ASSEMBLY PROCESS

(75) Inventors: Scott A. Wooldridge, Fort Wayne, IN (US); Thomas E. Kirk, Fort Wayne, IN (US); Eric M. Strauch, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 5 days.

(21) Appl. No.: 09/923,561

(22) Filed: Aug. 7, 2001

(Under 37 CFR 1.47)

Related U.S. Application Data

(60) Provisional application No. 60/223,127, filed on Aug. 7, 2000.

(51) Int. Cl.$^7$ ................................................. B60K 11/04
(52) U.S. Cl. ................. 180/68.4; 180/68.1; 267/140.13
(58) Field of Search .............................. 180/68.4, 68.1, 180/68.6, 68.2, 299, 291; 267/140.13, 140.11; 165/41, 149; 296/187, 203.01, 203.02

(56) References Cited

U.S. PATENT DOCUMENTS

| | | | | |
|---|---|---|---|---|
| 3,165,164 A | * | 1/1965 | Hosteler et al. | 180/89.15 |
| 5,123,695 A | * | 6/1992 | Kanemitsu et al. | 296/194 |
| 5,219,016 A | * | 6/1993 | Bolton et al. | 165/41 |
| 5,326,133 A | * | 7/1994 | Breed et al. | 280/735 |
| 5,346,029 A | * | 9/1994 | Batani et al. | 180/68.4 |
| 5,667,004 A | * | 9/1997 | Kroetsch | 165/41 |
| 5,960,899 A | * | 10/1999 | Roach | 180/68.4 |
| 6,205,638 B1 | * | 3/2001 | Yustick | 29/464 |
| 6,206,085 B1 | * | 3/2001 | Correa | 165/67 |
| 6,386,273 B1 | * | 5/2002 | Hateley | 165/67 |
| 6,470,961 B1 | * | 10/2002 | Case | 165/78 |
| 2002/0020572 A1 | * | 2/2002 | Wooldridge et al. | 180/68.4 |

* cited by examiner

Primary Examiner—Brian L. Johnson
Assistant Examiner—J. Allen Shriver
(74) Attorney, Agent, or Firm—Jeffrey P. Calfa; Dennis Kelly Sullivan; Susan L. Lukasik

(57) ABSTRACT

A cooling module mounting system and method of mounting the package to a vehicle is described. A chassis cross member for providing vertical support to the cooling package is sub-assembled to the cooling module separate from the vehicle where the two mounting surfaces can be held parallel to one another eliminating the possibility of unevenly preloading the isolator. Then this pre-assembled isolated system can be mounted on the truck chassis without changing the relationship of the compressed isolator when the module is bolted down during truck assembly. This system eliminates the fore aft adjustment variability allowing for more control over the static location and isolator compression of the cooling module in the truck. The stay rods used eliminate variation in the rod isolator compression during mounting. The stay rod also allows for controlled multi-axial movement with a mounting centerline perpendicular to the input loads.

10 Claims, 3 Drawing Sheets

COOLING MODULE MOUNTING SYSTEM AND ASSEMBLY PROCESS

This non-provisional patent application claims priority under Provisional Patent Application Serial No. 60/223,127, filed Aug. 7, 2000.

BACKGROUND

This invention relates to mobile vehicle engine cooling systems and the process for installation of such systems. Such vehicles appropriate for such installation include light, medium, and heavy-duty trucks.

PRIOR ART

Engine cooling systems contain a radiator or heat exchanger in which engine coolant is circulated for cooling. The radiator is in line for the passage of ambient air from a combination of ram movement from the vehicle and an engine fan. School buses and medium and heavy-duty trucks have chassis that have two generally parallel frame rails. These frame rails are jointed by a series of cross members. The frame rails act as the mounting point for a number of the chassis components as well as the cab of the vehicle. The prior art engine cooling system radiator mounting systems allowed fore aft adjustment to the cooling module. When the mounting angle of the radiator varies, it causes tolerance stack up problems with other components in the vicinity of the cooling package. This fore aft adjustment also allows variability in the mounting isolator compression. Uneven or preloaded compression of mounting isolators directly affects isolation of cooling module movement and the life expectancy of the actual isolator. The methods of mounting the cooling module onto the isolators and the mounting brackets are also a contributor to the uneven or preloaded mounting isolators.

One prior art method of mounting cooling modules was to mount the module without preloading the isolators by inserting the isolator into a hole in the mounting bracket and carefully lowering the module with a mounting bolt down into the isolator. Then the module would need to be centered and lowered onto the mounting bracket without preloading the isolator. Then the fore aft angle of the module was set by tightening down on the bolts along the centerline of the stay rod until the isolators on the stay rods compressed and bottomed out against a stop flange on the stay rod.

What is needed and does not exist in the prior art is a method of installing a cooling system module that allows preload of the isolators for the radiator prior to installation to the vehicle and a vehicle manufactured in such a manner.

SUMMARY

An object of the invention is to provide a method of installing a cooling system module that allows preload of the isolators for the radiator prior to installation to the vehicle and a vehicle manufactured in such a manner The method of this invention of mounting a cooling package to a vehicle and the module are described as follows. The chassis cross member for providing vertical support to the cooling package is sub-assembled to the cooling module separate from the vehicle where the two mounting surfaces can be held parallel to one another eliminating the possibility of unevenly preloading the isolator. Then this pre-assembled isolated system can be mounted on the truck chassis without changing the relationship of the compressed isolator when the module is bolted down during truck assembly. This system eliminates the fore aft adjustment variability. The elimination of the fore aft adjustment also allows for more control over the static location and isolator compression of the cooling module in the truck. The stay rods used eliminate variation in the rod isolator compression during mounting. The stay rod also allows for controlled multi-axial movement with a mounting centerline perpendicular to the input loads. The prior art isolators only allow input loads along the rod centerline in a fore aft direction.

This mounting system allows the cooling module to be completely plumbed to the engine before the main assembly line engine module drop. This also supports a manufacturing process that can mount isolators in a controlled manner prior to the engine module drop. Frame mounted castings provide a positive locating feature for the cooling modules height, fore/aft and side to side locations as well as setting the angle for proper stay rod alignment. Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
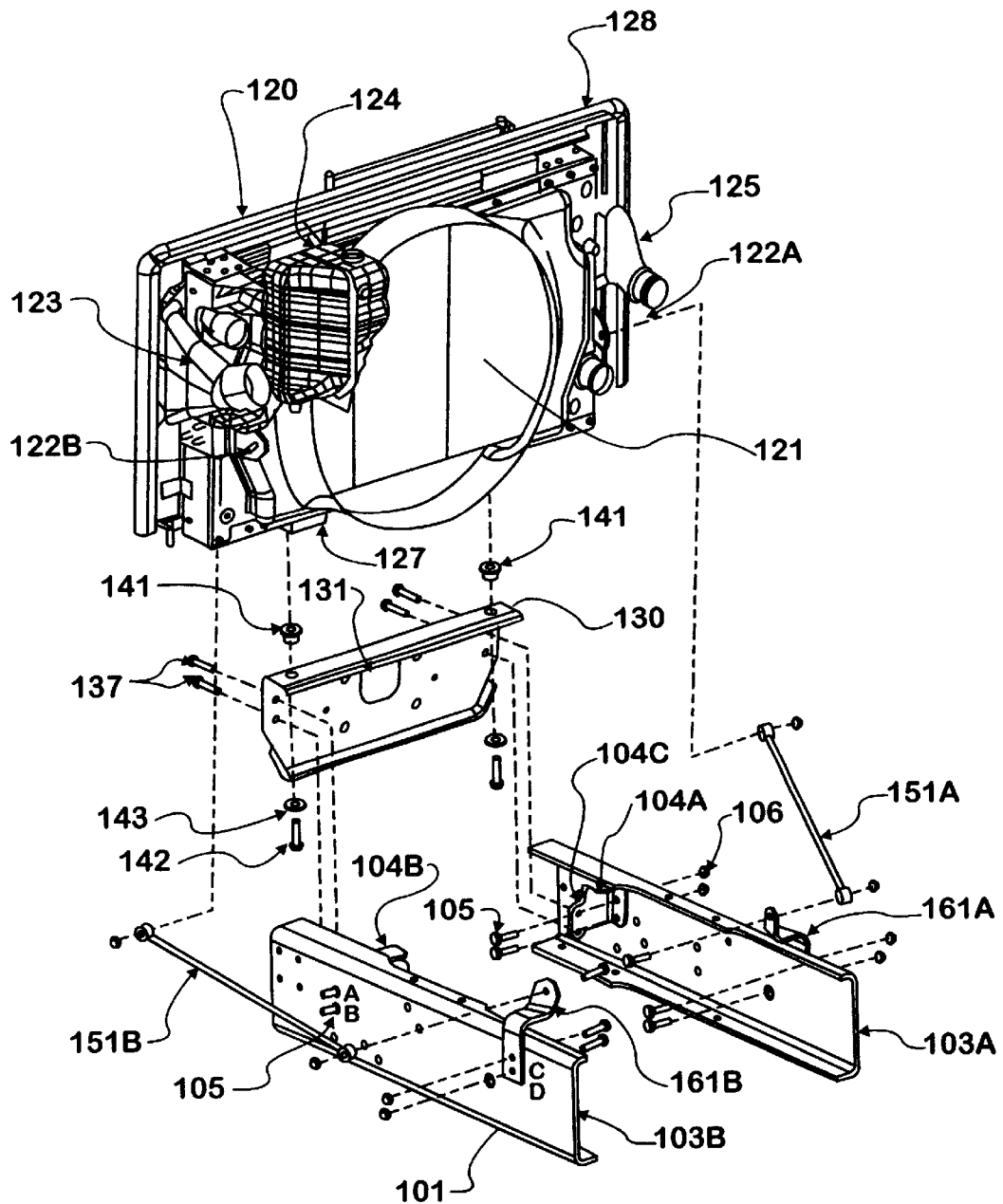
FIG. 1 is an exploded view of a portion of a vehicle chassis highlighting a cooling module mounting system in accordance with this invention.
Figure 2:
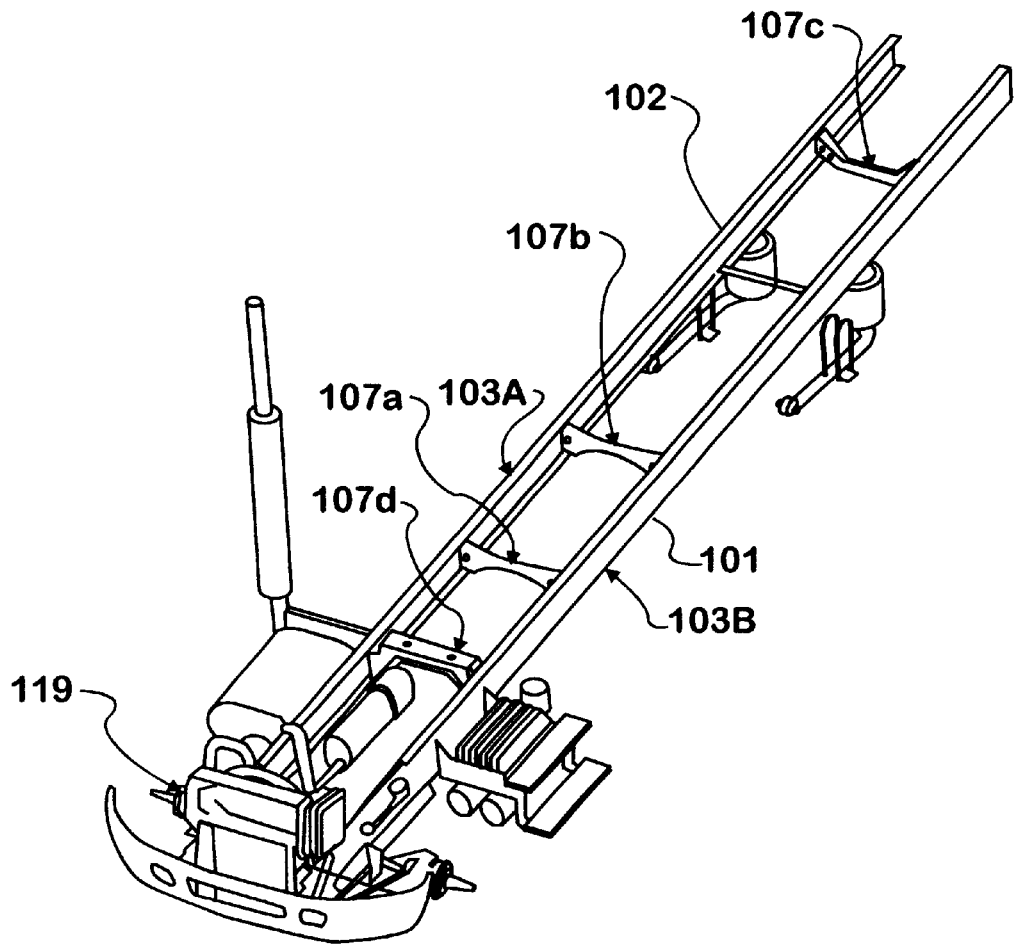
FIG. 2 is a perspective view of the vehicle chassis of FIG. 1.
Figures 3, 4:
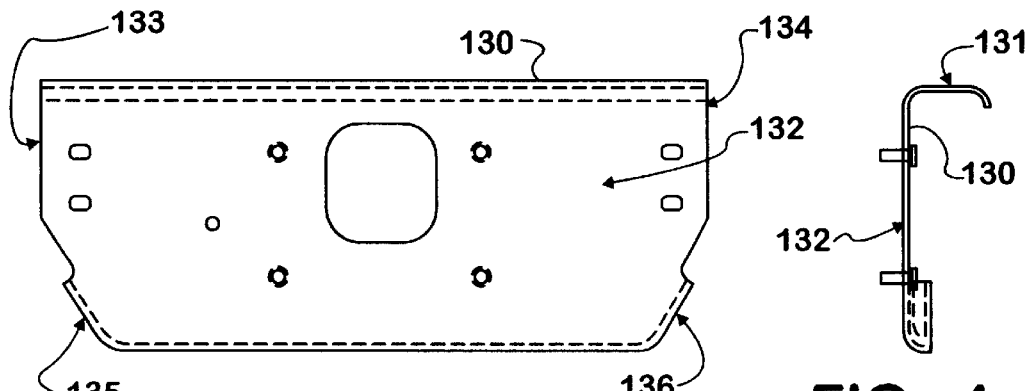
FIG. 3 is a front view of a chassis cross member of the cooling module mounting system of FIG. 1.
FIG. 4 is a side view of the chassis cross member of FIG. 3.
Figures 5, 6:
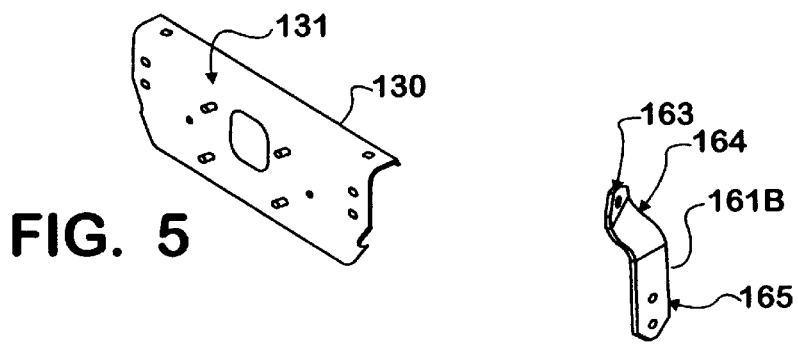
FIG. 5 is a perspective view of the chassis cross member of FIG. 3.
FIG. 6 is a left rear stay bracket of the cooling module mounting system of FIG. 1.
Figures 7, 8:
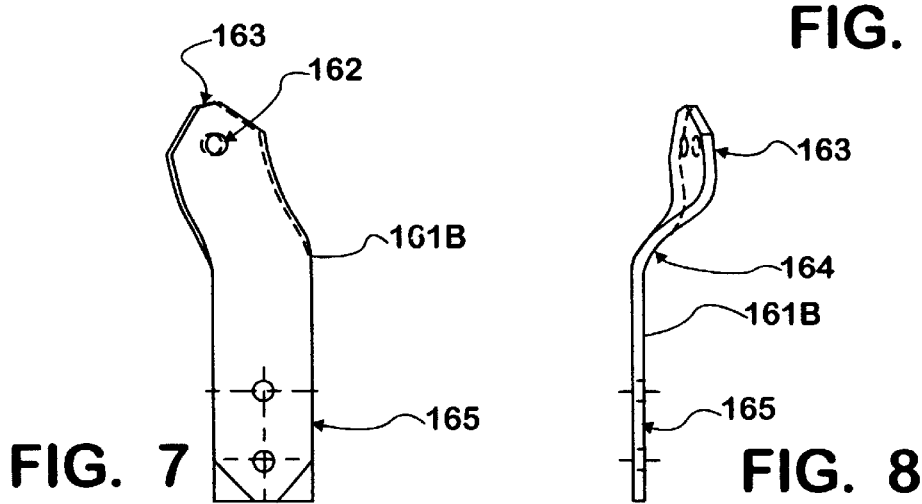
FIG. 7 is a front view of the left rear stay bracket of FIG. 6.
FIG. 8 is a side view of the left rear stay bracket of FIG. 6.

A vehicle 101 with a chassis 102 with two generally parallel frame rails 103A and 103B is well suited for installation of a cooling module mounting system 119 made in accordance with this invention. Such a vehicle 101 is shown in FIGS. 1 and 2 with some sub-parts shown in FIGS. 3 to 8. The frame rails 103A and 103B are shown as 'C' channels each facing inward, however generally parallel frame rail cross sections can be appropriate. The chassis 102 has rearward cross members 107A to 107D joining to and between the frame rails 103A and 103B.

The cooling module mounting system 119 is generally comprised of a cooling package 120, a chassis crossmember 130, cooling package to cross member isolators 141, stay rods 105A and 105B, rear stay brackets 151A and 151B, and frame mounted castings 104A and 104B for receiving mounting to the frame rails 103A and 103B and for receiving the chassis cross member 130. Front mounting brackets may be used in lieu of the frame mounted castings 104A and 104B with these front mounted brackets being manufactured other than as a casting.

The cooling package 120 contains the heat exchanger or radiator 121, a frame 128 to hold the radiator 121. There may be coolant inlet and outlet nozzles 123 and 125 engaged to the radiator 121 for easy plumbing. Additionally, the cooling package 120 may contain a radiator overflow or surge reservoir 124, also plumbed separate from a main assembly line. There are stay rod 151A and 151B mounting areas 122A and 122B for engagement to the stay rods 151A and 151B.

The chassis cross member 130 has a front face 132 engaged to an upper horizontal face 131. There is a member right side 133 and a member left side 134 for alignment and subsequent engagement with the chassis frame rail 103A and 103B mounted frame mounted castings 104A and 104B. The member edges 135 and 136 may be narrowed to allow for easy passage on mounting system 119 installation on the frame rails 103A and 103B. Upon lowering of the system 119, fasteners 137 are used to engage the chassis cross member 130 to the frame mounted castings 104A and 104I. The frame mounted castings 104A and 104B having previously been installed to the frame rails 103A and 103B through fastener set 105 and 106 along the assembly line.

Left and right rear stay brackets 161A and 161B are mounted to the respective frame rails 103A and 103B. The left rear stay bracket 161B is shown in the Figures, with the right stay bracket 161A being a mirror image. The right and left stay rods 151A and 151B are joined between the stay rod mounting areas 122A and 122B and the rear stay brackets 161A and 161B at location 162. The rear stay brackets 161A and 161B each contain a lower section 165 for mounting to the frame rails 103A and 103B and an upper section 163 for mounting to the stay rods 151A and 151B. The rear stay brackets 161A and 161B may contain a transition zone 164 that is curved to ensure that the stay rods 151A and 151B are set at the proper angle and hence ensuring that the cooling package 120 is at the correct angle relative to the chassis frame rails 103A and 103B. The stay rod transition zone 164 may be in a 'S' shaped curve to ensure the proper angle.

The method of this invention of mounting a cooling package 119 to the chassis 102 of the vehicle 101 and the package 119 are described as follows. The chassis cross member 130 for providing vertical support to the cooling package 119 is sub-assembled to the cooling module 120 separate from the vehicle 101 where the two mounting surfaces, the lower horizontal faces 127 of the cooling module 120 and the member upper horizontal face 131, can be held parallel to one another eliminating the possibility of unevenly preloading the isolators 141. Then this pre-assembled isolated system 119 can be mounted on the vehicle chassis 102 without changing the relationship of the compressed isolators 141 when the module package 119 is bolted down during vehicle 101 assembly. This system eliminates fore aft adjustment variability. The elimination of the fore aft adjustment also allows for more control over the static location and isolator 141 compression of the cooling module 119 in the vehicle 101. Stay rods 151A and 151B are used eliminate variation in the rod isolator 141 compression during mounting. The stay rods 151A and 151B also allow for controlled multi-axial movement with a mounting centerline perpendicular to the input loads.

The mounting system 119 has three main components. First the radiator mounting cross member 130 allows for a sub-assembly process that mounts the cooling module to the cross member 130 without preloading the isolators 141. The sub-assembly process allows improved access and control of the parts during the assembly process. This cross member 130 also provides a mounting surface for deaeration hose routing and auxiliary cooler mounting while supporting a full wet power train module drop at the main assembly line. Second, the frame mounted castings 104A and 104B provide a positive locating feature for the cooling modules 119 height, fore/aft, and side-to-side locations as well as setting the angle for proper stay rod alignment. The locating boss 104C sets side-to-side locations that insure the cooling module 119 and fan on the engine set at the same relationship. And, third the stay rod provides a repeatable means of setting the cooling module 119 angle, relative to the frame rails 103A and 103B, while still isolating and dampening the movement. The assembly process is not required to evaluate clearances between the fan and shroud or the cooling module and hood of the vehicle 101 with every vehicle. The relations ship is set and repeatable.

This mounting system 119 allows the cooling module 120 to be completely plumbed to a vehicle engine before the main assembly line engine module drop. This also supports a manufacturing process that can mount isolators 141 in a controlled manner prior to the engine module drop. The frame mounted castings 104A and 104B provide a positive locating feature for the cooling modules 119 height, fore/aft and side to side locations as well as setting the angle for proper stay rod 151A and 151B alignment.

As described above, the cooling module mounting system 119 and chassis with the cooling module mounting system 119 installed provide a number of advantages, some of which have been described above and others of which are inherent in the invention. Also modifications may be proposed to the cooling module mounting system 119 and chassis with the cooling module mounting system 119 installed without departing from the teachings herein.

We claim:

1. A method for installing an engine cooling package onto a chassis for a mobile vehicle, the chassis having two generally parallel frame rails connected by rearward cross members, comprised of the steps of:

engaging a radiator to a radiator frame, along with engaging engine coolant inlet and outlet nozzles to the radiator to form a cooling package; engaging a lower horizontal face of the cooling package to an upper horizontal face of a chassis cross member while preloading compressible isolators at the mating area between the cooling package and the chassis cross member to form a cooling module, the chassis cross member having a front face engaged to the upper horizontal face and a member right side and a member left side, the member right side and left sides having narrowed member edges, and the cooling module having mounting areas for stay rods;

engaging a frame mounted bracket to each frame rail along an assembly line;

engaging a rear stay bracket rearward of the frame mounted bracket on each frame rail along an assembly line, said stay rods containing a transition zone with a shape to set the angle of stay rods upon attachment to each rear stay bracket;

moving the cooling module to a main assembly line for chassis engagement, the chassis moving along the assembly line;

lowering the cooling module to the frame rails to engage the chassis cross member right and left sides to the frame mounted bracket on each frame rail without changing the preload of the isolators between the cooling package and the chassis cross member;

connecting the chassis cross member to the frame mounted castings through fasteners; and engaging stay rods between the mounting areas on the cooling module and the rear stay brackets to achieve the proper angle of the cooling package relative to the frame rails.

2. The method of claim 1, wherein said stay rod transition zone for each rear stay rod is in an 'S' shape to ensure stay rod angle set.

3. The method of claim 2, additionally comprising the following step after engaging the radiator to the radiator frame:

engaging a radiator overflow reservoir to the cooling package and plumbing the reservoir to the radiator prior to moving the cooling package to the assembly line.

4. A method for installing an engine cooling package onto a chassis for a mobile vehicle, the chassis having two generally parallel frame rails connected by rearward cross members. comprised of the steps of:

engaging a radiator to a radiator frame, along with engaging engine coolant inlet and outlet nozzles to the radiator;

engaging a radiator reservoir to the radiator frame and plumbing the reservoir to the radiator to form a cooling package containing the radiator, the frame, the radiator nozzles and the reservoir;

engaging a lower horizontal face of the cooling package to an upper horizontal face of a chassis cross member while preloading compressible isolators at the mating area between the cooling package and the chassis cross member to form a cooling module, the chassis cross member having a front face engaged to the upper horizontal face and a member right side and a member left side, the member right side and left sides having narrowed member edges, and the cooling module having mounting areas for stay rods;

engaging a frame mounted bracket to each frame rail along an assembly line;

engaging a rear stay bracket rearward of the frame mounted bracket on each frame rail along an assembly line, said stay rods containing a transition zone with a shape to set the angle of stay rods upon attachment to each rear stay bracket;

moving the cooling module to a main assembly line for chassis engagement, the chassis moving along the assembly line;

lowering the cooling module to the frame rails to engage the chassis cross member right and left sides to the frame mounted bracket on each frame rail without changing the preload of the isolators between the cooling package and the chassis cross member;

connecting the chassis cross member to the frame mounted castings through fasteners; and engaging stay rods between the mounting areas on the cooling module and the rear stay brackets to achieve the proper angle of the cooling package relative to the frame rails.

5. A method for installing an engine cooling package onto a chassis for a mobile vehicle, the chassis having two generally parallel frame rails connected by rearward cross members, comprised of the steps of:

engaging a radiator to a radiator frame to form a cooling package;

engaging a lower horizontal face of the cooling package to an upper horizontal face of a chassis cross member while preloading compressible isolators at the mating area between the cooling package and the chassis cross member to form a cooling module, the chassis cross member having a front face engaged to the upper horizontal face and a member right side and a member left side, and the cooling module having mounting areas for stay rods;

engaging a front mounting bracket to each frame rail along an assembly line;

engaging a rear stay bracket rearward of the frame mounted bracket on each frame rail along an assembly line, said stay rods containing a transition zone with a shape to set the angle of stay rods upon attachment to each rear stay bracket;

moving the cooling module to a main assembly line for chassis engagement, the chassis moving along the assembly line;

lowering the cooling module to the frame rails to engage the chassis cross member right and left sides to the front mounting bracket on each frame rail without changing the preload of the isolators between the cooling package and the chassis cross member;

connecting the chassis cross member to the front mounting bracket through fasteners; and engaging stay rods between the mounting areas on the cooling module and the rear stay brackets to achieve the proper angle of the cooling package relative to the frame rails.

6. A mobile vehicle chassis manufactured by the steps comprised of:

engaging two generally parallel frame rails through rearward cross members;

engaging a radiator to a radiator frame, along with engaging engine coolant inlet and outlet nozzles to said radiator to form a cooling package;

engaging a lower horizontal face of said cooling package to an upper horizontal face of a chassis cross member while preloading compressible isolators at the mating area between said cooling package and said chassis cross member to form a cooling module, said chassis cross member having a front face engaged to said upper horizontal face and a member right side and a member left side, said member right side and left sides having narrowed member edges, and said cooling module having mounting areas for stay rods;

engaging a frame mounted bracket to each frame rail along an assembly line;

engaging a rear stay bracket rearward of said frame mounted bracket on each frame rail along an assembly line, said stay rods containing a transition zone with a shape to set a mounting angle of stay rods upon attachment to each rear stay bracket;

moving said cooling module to a main assembly line for chassis engagement, said chassis moving along the assembly line;

lowering said cooling module to said frame rails to engage said chassis cross member right and left sides to said frame mounted bracket on each frame rail without changing said preload of said isolators between said cooling package and said chassis cross member;

connecting said chassis cross member to the frame mounted brackets through fasteners; and engaging stay rods between said mounting areas on said cooling module and said rear stay brackets to achieve the proper angle of said cooling package relative to said frame rails.

7. The vehicle of claim 6, wherein said or stay rod transition zone for each rear stay rod is in an 'S' shape to ensure stay rod angle set.

8. The vehicle of claim 7, wherein:
   a radiator overflow reservoir is engaged to said cooling package and plumbing said reservoir to said radiator prior to moving said cooling package to said assembly line.

9. A mobile vehicle chassis manufactured by the steps comprised of:
   engaging two generally parallel frame rails through rearward cross members;
   engaging a radiator to a radiator frame, along with engaging engine coolant inlet and outlet nozzles to said radiator;
   engaging a radiator reservoir to said radiator frame and plumbing said reservoir to said radiator to form a cooling package containing said radiator, said frame, said radiator nozzles and said reservoir;
   engaging a lower horizontal face of said cooling package to an upper horizontal face of a chassis cross member while preloading compressible isolators at said mating area between said cooling package and said chassis cross member to form a cooling module, said chassis cross member having a front face engaged to said upper horizontal face and a member right side and a member left side, said member right side and left sides having narrowed member edges, and said cooling module having mounting areas for stay rods;
   engaging a frame mounted bracket to each frame rail along an assembly line;
   engaging a rear stay bracket rearward of said frame mounted bracket on each frame rail along an assembly line, said stay rods containing a transition zone with a shape to set said angle of stay rods upon attachment to each rear stay bracket;
   moving said cooling module to a main assembly line for chassis engagement, said chassis moving along said assembly line;
   lowering said cooling module to said frame rails to engage said chassis cross member right and left sides to said frame mounted bracket on each frame rail without changing said preload of said isolators between said cooling package and said chassis cross member;
   connecting said chassis cross member to said frame mounted bracket through fasteners; and
   engaging stay rods between said mounting areas on said cooling module and said rear stay brackets to achieve said proper angle of said cooling package relative to said frame rails.

10. A mobile vehicle chassis manufactured by the steps comprised of:
   engaging two generally parallel frame rails through rearward cross members;
   engaging a radiator to a radiator frame to form a cooling package;
   engaging a lower horizontal face of said cooling package to an upper horizontal face of a chassis cross member while preloading compressible isolators at said mating area between said cooling package and said chassis cross member to form a cooling module, said chassis cross member having a front face engaged to said upper horizontal face and a member right side and a member left side, and said cooling module having mounting areas for stay rods;
   engaging a front mounting bracket to each frame rail along an assembly line;
   engaging a rear stay bracket rearward of said frame mounted bracket on each frame rail along an assembly line, said stay rods containing a transition zone with a shape to set said angle of stay rods upon attachment to each rear stay bracket;
   moving said cooling module to a main assembly line for chassis engagement, said chassis moving along said assembly line;
   lowering said cooling module to said frame rails to engage said chassis cross member right and left sides to said front mounting bracket on each frame rail without changing said preload of said isolators between said cooling package and said chassis cross member;
   connecting said chassis cross member to said front mounting bracket through fasteners; and
   engaging stay rods between said mounting areas on said cooling module and said rear stay brackets to achieve said proper angle of said cooling package relative to said frame rails.

* * * * *